(12) United States Patent
Nakaie et al.

(10) Patent No.: US 10,880,448 B2
(45) Date of Patent: Dec. 29, 2020

(54) IMAGE READING DEVICE AND IMAGE FORMING APPARATUS

(71) Applicant: FUJI XEROX CO., LTD., Tokyo (JP)

(72) Inventors: Katsuhiko Nakaie, Kanagawa (JP); Yoshihira Rai, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/511,646

(22) Filed: Jul. 15, 2019

(65) Prior Publication Data
US 2020/0304669 A1   Sep. 24, 2020

(30) Foreign Application Priority Data

Mar. 22, 2019   (JP) ................................ 2019-054658

(51) Int. Cl.
*H04N 1/00* (2006.01)
*H04N 1/028* (2006.01)

(52) U.S. Cl.
CPC ..... *H04N 1/00798* (2013.01); *H04N 1/02845* (2013.01); *H04N 1/02895* (2013.01)

(58) Field of Classification Search
CPC ....................... H04N 1/00798; H04N 1/02845
See application file for complete search history.

(56) References Cited

U.S. PATENT DOCUMENTS

| | | | | |
|---|---|---|---|---|
| 2011/0278787 | A1* | 11/2011 | Fukusaka | B65H 3/54 271/104 |
| 2015/0271354 | A1* | 9/2015 | Imoto | G02B 27/0966 362/308 |
| 2018/0059603 | A1* | 3/2018 | Miyahara | H04N 1/0005 |

FOREIGN PATENT DOCUMENTS

| | | |
|---|---|---|
| JP | 6-55731 A | 3/1994 |
| JP | 7-56455 A | 3/1995 |
| JP | 2006-151543 A | 6/2006 |

\* cited by examiner

*Primary Examiner* — Ibrahim Siddo
(74) *Attorney, Agent, or Firm* — Sughrue Mion, PLLC

(57) ABSTRACT

An image reading device includes a reading unit that reads an image formed on a first surface of a medium; a support unit that supports the medium from a second surface opposite to the first surface; and a pressing unit that blows air from a first surface side so as to press a portion of the medium to be read by the reading unit against the support unit.

7 Claims, 7 Drawing Sheets

IMAGE READING DEVICE AND IMAGE FORMING APPARATUS

CROSS-REFERENCE TO RELATED APPLICATIONS

This application is based on and claims priority under 35 USC 119 from Japanese Patent Application No. 2019-054658 filed Mar. 22, 2019.

BACKGROUND

(i) Technical Field

The present disclosure relates to an image reading device and an image forming apparatus.

(ii) Related Art

A transport device that transports a medium such as a sheet of paper is, for example, used in an image reading device and an image forming apparatus. A medium transported by a transport device in an image forming apparatus easily curls especially after heating for fixation of an image. Therefore, a heated medium sometimes floats up from an endless belt of the transport device during transport, thereby causing a trouble such as a paper jam. In view of this, various techniques for stabilizing a posture of a transported medium have been developed.

Japanese Unexamined Patent Application Publication No. 2006-151543 describes a sheet transport device including an endless belt that has a large number of holes formed in a sheet transport surface and is driven to rotate and an air intake release part that takes air in from an inner side of the endless belt and releases the air thus taken in toward the endless belt from an outer side.

Japanese Unexamined Patent Application Publication No. 6-55731 describes an ink-jet printer including a transport path that is provided with plural opened holes and transports a sheet of paper to a print head and transports a sheet of paper on which printing has been performed by the print head, a suction unit that sucks a sheet of paper through the plural opened holes of the transport path so that the sheet of paper makes close contact with the transport path, and an air blowing path that blows exhaust air of this suction unit to a printing surface of a sheet of paper on which printing has been completed.

Japanese Unexamined Patent Application Publication No. 7-56455 describes an image forming apparatus in which a belt transport unit that has a suction duct is provided on an inlet side and an outlet side of a heat roll fixing device.

SUMMARY

The trouble that occurs in a medium during transport also causes a problem in an image reading device. In particular, a posture of a medium need be stable at a reading position in order that an image reading device correctly reads an image formed on a medium.

Aspects of non-limiting embodiments of the present disclosure relate to stabilizing a posture during transport of a medium on which an image to be read has been formed.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an image reading device including a reading unit that reads an image formed on a first surface of a medium; a support unit that supports the medium from a second surface opposite to the first surface; and a pressing unit that blows air from a first surface side so as to press a portion of the medium to be read by the reading unit against the support unit.

BRIEF DESCRIPTION OF THE DRAWINGS

An exemplary embodiment of the present disclosure will be described in detail based on the following figures, wherein.

DETAILED DESCRIPTION

Exemplary Embodiment

Configuration of Image Forming Apparatus

Figure 1:
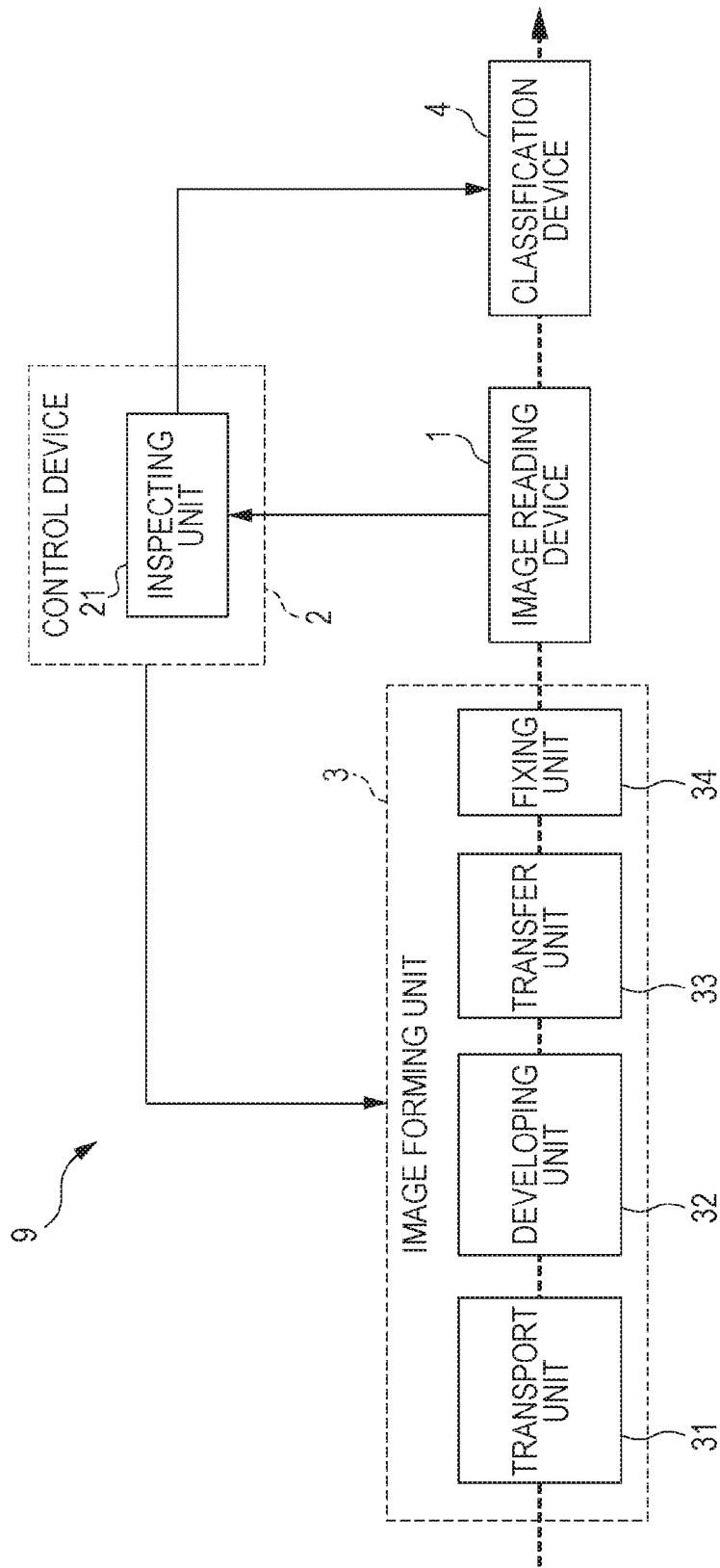
FIG. 1 is a diagram illustrating an example of a configuration of an image forming apparatus.

FIG. 1 is a diagram illustrating an example of a configuration of an image forming apparatus 9. The image forming apparatus 9 illustrated in FIG. 1 includes an image reading device 1, a control device 2, an image forming unit 3, and a classification device 4.

The control device 2 has a central processing unit (CPU), a read only memory (ROM), a random access memory (RAM), and a storage unit such as a hard disk drive or a solid state drive. The CPU reads out a computer program (hereinafter simply referred to as a program) stored in the ROM or the storage unit and executes the program, and thus the control device 2 controls each unit of the image forming apparatus 9.

The image forming unit 3 forms an image, for example, by transferring and fixing toner onto a medium such as a sheet of paper or an overhead projector (OHP) film under control of the control device 2. The image forming unit 3 has a transport unit 31, a developing unit 32, a transfer unit 33, and a fixing unit 34. The transport unit 31 has, for example, a pair of rollers that are supported so as to be rotatable about an axis and an endless belt that is suspended across these rollers and forms a medium transport path. The transport unit 31 takes a medium out from a container one by one and transports the medium to the developing unit 32, the transfer unit 33, and the fixing unit 34.

The developing unit 32 has, for example, a photoconductor drum, a charging unit, an exposure unit, and a development roll. The photoconductor drum has a photosensitive layer charged by the charging unit and forms an electrostatic latent image representing an image based on image data designated by the control device 2 upon receipt of exposure light on the photosensitive layer from an exposure unit. The development roll supplies charged toner to the photoconductor drum upon application of a developing bias voltage so as to develop the electrostatic latent image.

The transfer unit 33 has, for example, a first transfer roll, a second transfer roll, an intermediate transfer belt, and a backup roll. The first transfer roll is provided at a position opposed to the photoconductor drum so as to sandwich the intermediate transfer belt. An image formed on the photoconductor drum is transferred (referred to as first transfer) onto the intermediate transfer belt that is an endless belt by a voltage applied to the first transfer roll and the photoconductor drum. The second transfer roll and the backup roll are provided so as to face each other with the intermediate transfer belt interposed therebetween and form a nip part. A voltage is applied to the second transfer roll so that a potential difference occurs between the second transfer roll and the backup roll. A medium transported by the transport unit 31 makes contact with the intermediate transfer belt when passing the nip part, and an image held by the intermediate transfer belt is transferred (referred to as second transfer) onto the medium by the aforementioned voltage.

The fixing unit 34 has, for example, a heating roll and a pressurizing roll. The heating roll and the pressurizing roll constitute a nip part. When a medium on which an image has been second-transferred by the transfer unit 33 and that is transported by the transport unit 31 passes this nip part, the pressurizing roll pressurizes this medium onto the heating roll, and the heating roll heats this medium. This causes the image second-transferred by the transfer unit 33 to be fixed onto the medium. The transport unit 31 transports the medium that has passed the fixing unit 34 and on which the image has been fixed to the image reading device 1.

The image reading device 1 receives a medium transported from the image forming unit 3 and reads an image formed on this medium under control of the control device 2. The image reading device 1 sends image data indicative of the read image to an inspecting unit 21 of the control device 2. The inspecting unit 21 determines whether or not the image formed on the medium by the image forming unit 3 has an abnormality by inspecting the image data sent from the image reading device 1.

The image forming apparatus 9, for example, causes the image forming unit 3 and the classification device 4 to perform correction of gradation, classification of the medium, and the like by using a result of inspection of the inspecting unit 21. That is, the image reading device 1 functions as an inline sensor in the image forming apparatus 9. The image reading device 1 sends the medium to the classification device 4 after reading the image on the medium.

The classification device 4 classifies a medium under control of the control device 2. The classification device 4 has two or more containing spaces and a switcher that sends a medium sent from the image reading device 1 to any one of these containing spaces. The inspecting unit 21 of the control device 2 sends, to the classification device 4, a control signal for classifying the medium in accordance with a result of inspection. The classification device 4 transports the medium to a corresponding storing space in accordance with the control signal sent from the inspecting unit 21. In this way, a medium having an abnormality in an image and a medium having no abnormality in an image are contained in the two or more containing spaces, respectively so as to be distinguished from each other. That is, the classification device 4 classifies a medium in accordance with a result of inspection.

Configuration of Image Reading Device

Figure 2:
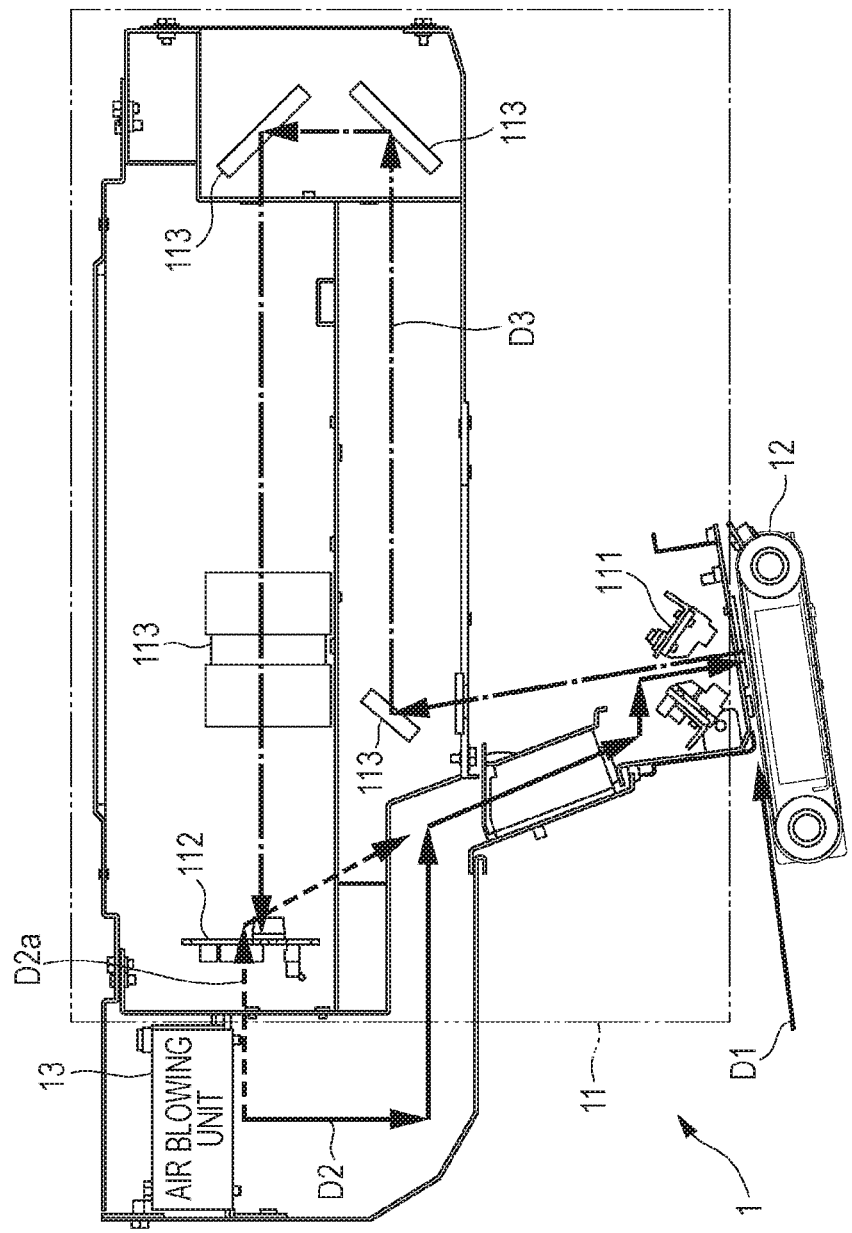
FIG. 2 illustrates a configuration of an image reading device.

FIG. 2 illustrates a configuration of the image reading device 1. As illustrated in FIG. 2, the image reading device 1 has a reading unit 11, a support unit 12, and an air blowing unit 13.

The reading unit 11 has an irradiating unit 111, an imaging element 112, and an optical system 113. The irradiating unit 111 is, for example, a fluorescent lamp such as a xenon lamp or a light emitting diode (LED) and irradiates a surface on which an image has been formed with light among surfaces of a medium transported from the image forming unit 3 along arrow D1 illustrated in FIG. 2.

The optical system 113 has plural mirrors, prisms, lenses, and the like along arrow D3 illustrated in FIG. 2 and guides light reflected by the medium to the imaging element 112. That is, the optical system 113 is a reduction optical system.

The imaging element 112 is, for example, a complementary metal oxide semiconductor (CMOS) or a charge coupled device (CCD). The imaging element 112 generates an electric signal in accordance with guided reflected light and sends data according to this electric signal to the control device 2 illustrated in FIG. 1. In this way, the control device 2 receives the image data according to the image formed on the medium.

That is, the reading unit 11 reads an image formed on a medium and sends image data indicative of this image to the control device 2. A surface of the medium on which the image read by the reading unit 11 among surfaces of the medium is referred to as a first surface. That is, the reading unit 11 is an example of a reading unit that reads an image formed on a first surface of a medium. The image forming unit 3 that forms an image on the first surface is an example of an image forming unit that forms an image on a first surface of a medium.

Image data read by the reading unit 11 is sent to the inspecting unit 21 realized by the control device 2, and the inspecting unit 21 determines whether or not there is an abnormality. That is, the inspecting unit 21 is an example of an inspecting unit that inspects an image read by a reading unit.

The support unit 12 is a member that supports a medium from a surface (referred to as a second surface) opposite to the first surface. That is, the support unit 12 is an example of a support unit that supports a medium from a second surface opposite to a first surface.

Figure 3:
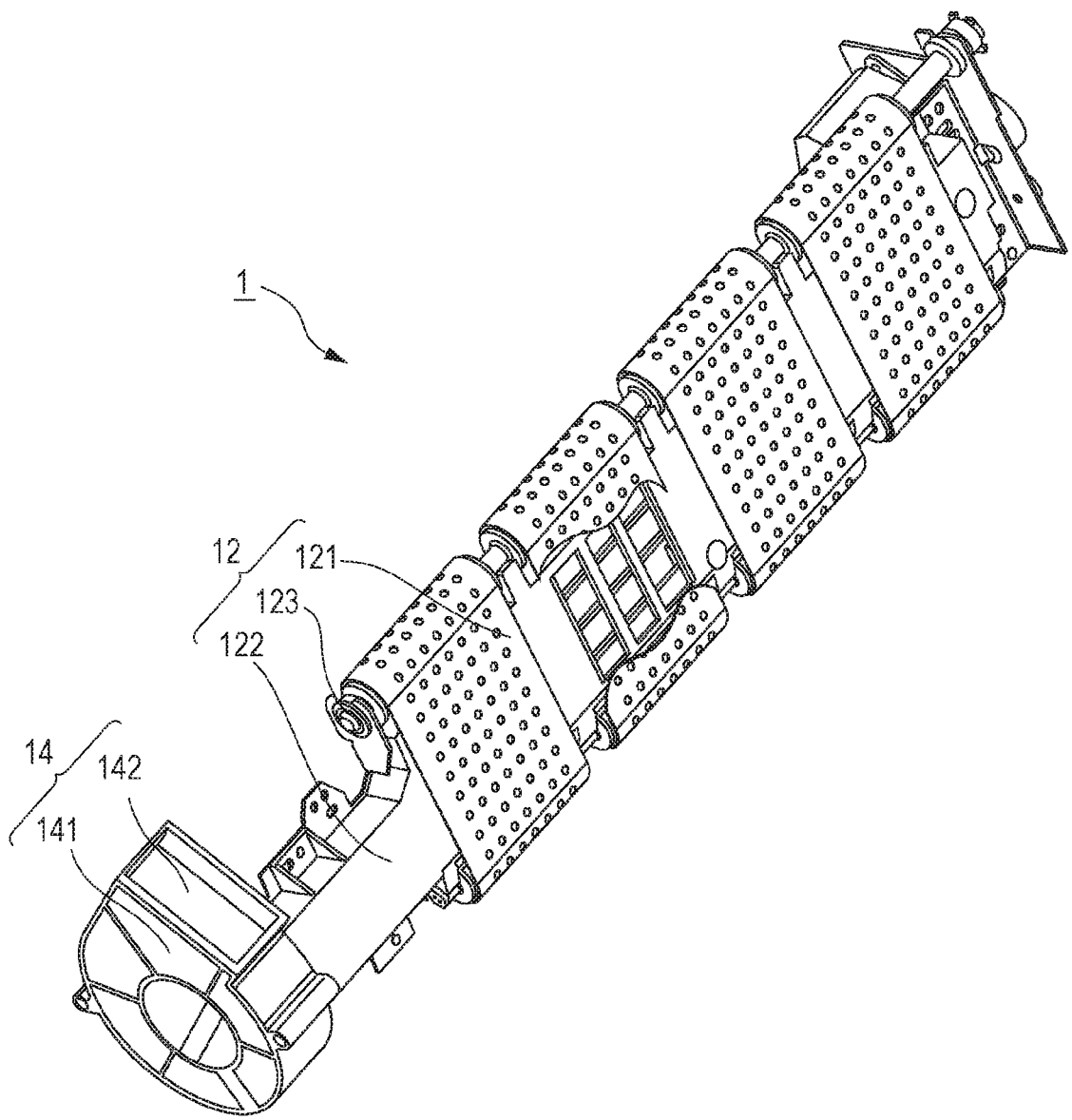
FIG. 3 illustrates an example of a support unit.

FIG. 3 illustrates an example of the support unit 12. The support unit 12 illustrated in FIG. 3 has a belt 121, a vacuum duct 122, and rolls 123. Furthermore, the image reading device 1 illustrated in FIG. 3 has a suction unit 14.

The belt 121 is an endless belt that is suspended across two rolls 123 of the support unit 12 and is made of a material that allows passage of air. The belt 121 is, for example, provided with plural holes disposed in a grid manner as illustrated in FIG. 3.

The vacuum duct 122 is a container surrounded by the belt 121, and a wall surface of the vacuum duct 122 is provided with plural holes through which air passes. This wall surface forms a space in which air that has passed through the belt 121 is collected. That is, the support unit 12 that has the belt 121 and the vacuum duct 122 provided with plural holes through which air passes is an example of a support unit made of a material that allows passage of air.

The two rolls 123 are disposed in parallel at both ends of the vacuum duct 122. Any one of these two rolls 123 is driven under control of the control device 2. This causes the belt 121 suspended across these rolls 123 to rotate. The belt 121 thus transports a medium while supporting the medium on an outer circumferential surface. The outer circumferential surface of the belt 121 suspended across these two rolls 123 passes a position irradiated with light by the irradiating unit 111 of the reading unit 11, i.e., a position read by the reading unit 11. That is, the support unit 12 illustrated in FIG. 3 is an example of a support unit that transports a medium while supporting the medium so that the medium passes a position read by a reading unit.

The suction unit 14 illustrated in FIG. 3 has a suction fan 141 and an outlet 142. The suction fan 141 of the suction unit 14 is, for example, a vacuum pump or a blower, and an inlet of the suction fan 141 is connected to the vacuum duct 122. The suction fan 141 sucks air on an outer circumferential side of the belt 121 from the holes provided in the belt 121 and the wall surface of the vacuum duct 122 into an inside of the vacuum duct 122. Then, the suction fan 141 releases the sucked air from the outlet 142. That is, the suction unit 14 illustrated in FIG. 3 is an example of a suction unit that sucks air. The air released from the outlet 142 is guided to a duct (not illustrated) and is released to an outside of a housing of the image forming apparatus 9.

When the suction fan 141 is driven in a state where a medium is being supported on the outer circumferential surface of the belt 121, air sandwiched between the belt 121 and the medium is sucked by the suction fan 141, passes through the inside of the vacuum duct 122, and is then released from the outlet 142. As a result, an atmospheric pressure in a space sandwiched between the belt 121 and the medium becomes negative, and the medium is sucked toward the belt 121. That is, the suction unit 14 in this configuration is an example of a suction unit that sucks air sandwiched between a support unit and a medium through the support unit so that the medium approaches the support unit.

The air blowing unit 13 has an air blowing device such as a blower or a fan and sends air along arrow D2 illustrated in FIG. 2. On a path of arrow D2, a medium transported while being supported by the support unit 12 and the reading unit 11 that reads an image formed on the medium are present. Air sent from the air blowing unit 13 is blown onto the first surface of the medium. As a result, a portion of this medium to be read by the reading unit 11 is pressed against the support unit 12. Since a distance of an optical path from the portion pressed against the support unit 12 to the imaging element 112 through the optical system 113 is maintained, the reading processing stabilizes. That is, the configuration in which air sent from the air blowing unit 13 is guided to a first surface side by using a flow of the air and is blown from the first surface side so as to press a portion of the medium to be read by the reading unit against the support unit is an example of a pressing part according to the present disclosure.

Figure 4:
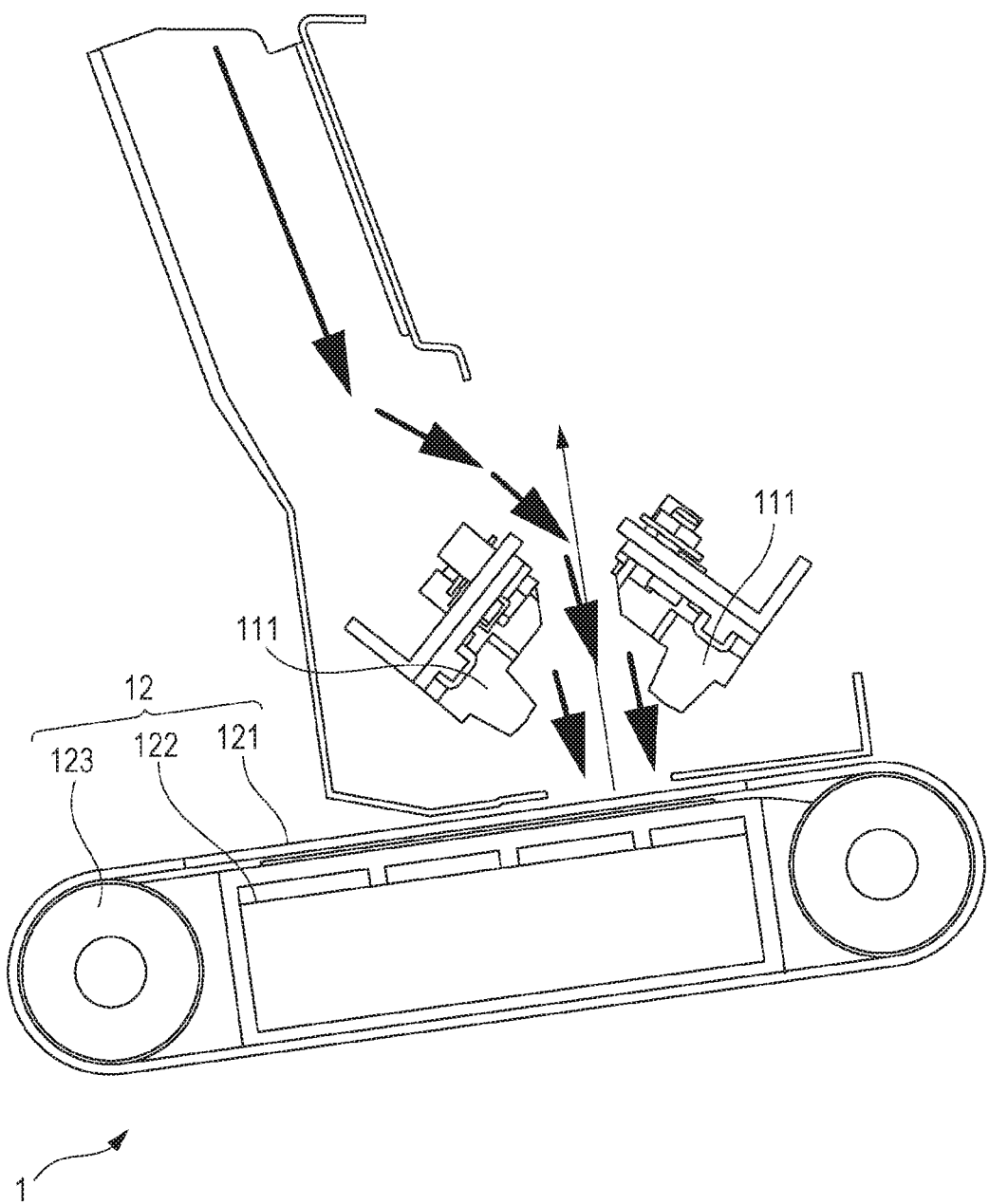
FIG. 4 illustrates a flow of air blown by an air blowing unit.

FIG. 4 illustrates a flow of air blown by the air blowing unit 13. As illustrated in FIG. 4, the reading unit 11 has two irradiating units 111. These two irradiating units 111 are disposed side by side on an upstream side and a downstream side in a direction (referred to as a transport direction) in which a medium is transported by the support unit 12 and irradiate a medium transported by the belt 121 of the support unit 12 with light from different angles. As a result, shade is unlikely to occur on the medium even in a case where the first surface of the medium is uneven.

As illustrated in FIG. 4, air sent from the air blowing unit 13 illustrated in FIG. 2 causes a portion of the medium to be read by the reading unit 11 to be pressed against the support unit 12 and passes a surrounding region around the irradiating units 111 of the reading unit 11. Accordingly, heat generated from the irradiating units 111 is removed by air sent from the air blowing unit 13 and blown onto the medium. That is, the configuration in which an irradiating unit is cooled by air sent from the air blowing unit 13 and the air is guided to a support unit that supports a portion to be read by a reading unit so that the portion is pressed against the support unit is an example of a pressing unit according to the present disclosure.

As described above, according to the image reading device 1 according to the present disclosure, a posture of a medium during reading of an image is stabilized since the medium is pressed against the support unit 12. A focal distance from a portion of the medium read by the reading unit 11 to the imaging element 112 of the reading unit 11 is maintained. Accordingly, an image read by the reading unit 11 is unlikely to be disturbed. Furthermore, since the medium is pressed against the support unit 12 side and is therefore unlikely to make contact with the reading unit 11, it is unnecessary to disposed glass or the like for protecting the reading unit 11 between the medium and the reading unit 11.

Modifications

The exemplary embodiment has been described above, but the contents of the exemplary embodiment can be modified as follows. The following modifications may be combined.

<1> Although the air blowing unit 13 sends air along arrow D2 illustrated in FIG. 2 in the above exemplary embodiment, air may be sent along arrow D2*a* indicated by the broken line in FIG. 2. Arrow D2*a* indicated by the broken line in FIG. 2 passes a surrounding region around the imaging element 112 of the reading unit 11. Accordingly, when the air blowing unit 13 causes air to flow along arrow D2*a*, this air causes a medium to be pressed against the support unit 12 and cools the imaging element 112. That is, the configuration in which an imaging element is cooled by air sent from the air blowing unit 13 and the air is guided to the support unit 12 that supports a portion of a medium to be read by the reading unit 11 so that the portion of the medium is pressed against the support unit 12 in this modification is an example of a pressing unit according to the present disclosure.

<2> Although the image reading device 1 has the suction unit 14 in the above exemplary embodiment, the image reading device 1 may be configured not to have the suction unit 14. Even in this case, the air blowing unit 13 causes a portion of a medium to be read by the reading unit 11 to be pressed against the support unit 12, and therefore a posture of the medium is stabilized as compared with a case where the air blowing unit 13 is not provided.

<3> Although the support unit 12 of the image reading device 1 transports a medium so that the medium passes a position read by the reading unit 11 in the above exemplary embodiment, the support unit 12 is not limited to this. The support unit 12 may be configured not to have a transport function as long as the support unit 12 supports a medium from a second surface. The support unit 12 may be, for example, a chute on which a medium slides due to its own weight. A medium supported by the support unit 12 may be fan-folded paper. In this case, the medium need just be transported in a state where a tractor feeder is engaged with sprocket holes provided on both ends in a width direction that crosses a medium transport direction. The support unit 12 need just support a central part of the medium transported by the tractor feeder from a second surface. That is, the support unit 12 need not transport a medium as long as the support unit 12 supports the medium from a second surface opposite to a first surface.

<4> Although air sucked by the suction fan 141 of the suction unit 14 and released from the outlet 142 is guided into a duct (not illustrated) and is then released to an outside of the housing of the image forming apparatus 9 in the above exemplary embodiment, the air may be sent to the air blowing unit 13.

Figure 5:
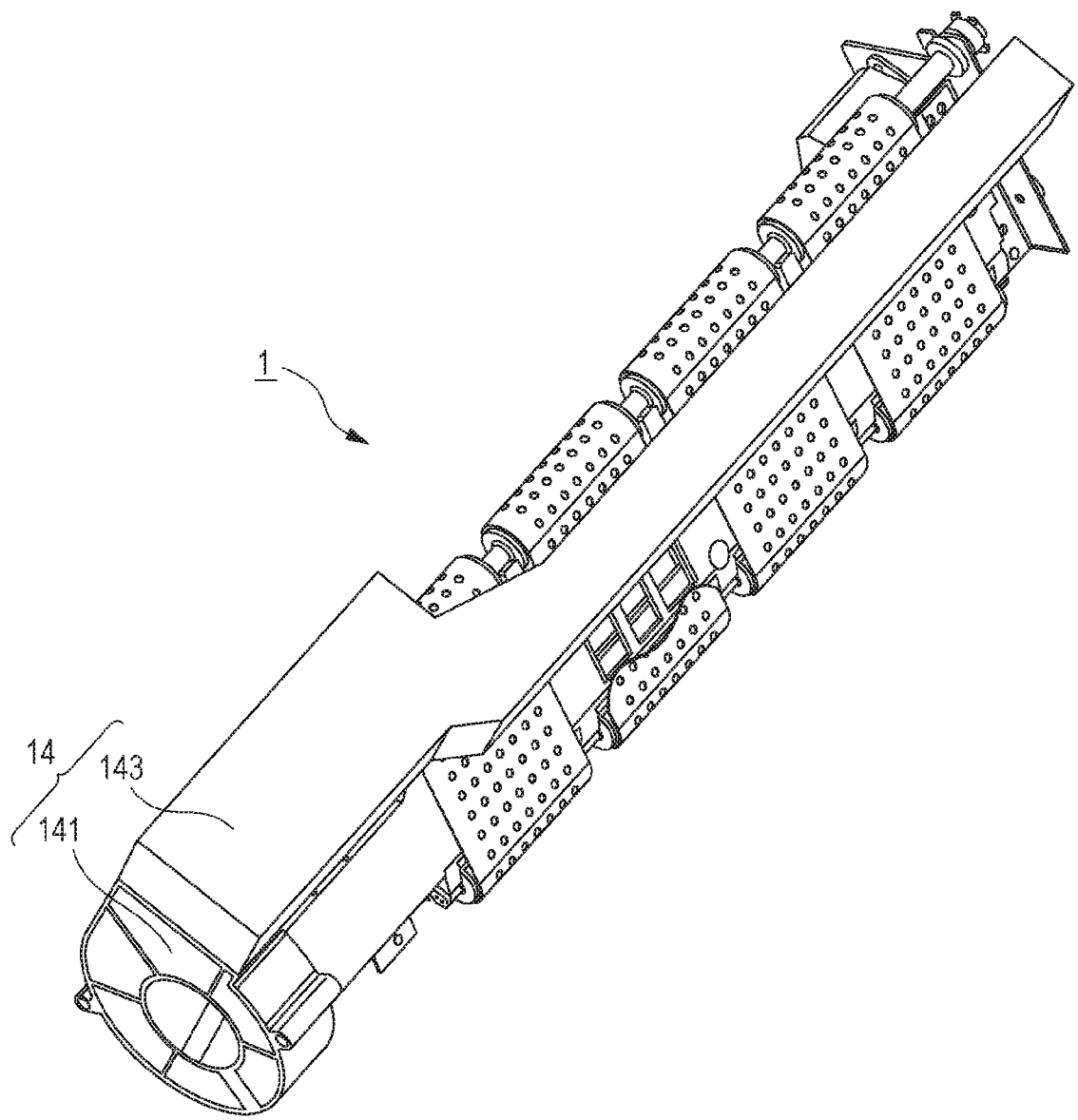
FIG. 5 illustrates an example of a suction unit that also functions as the air blowing unit.

The suction unit 14 may also function as the air blowing unit 13. FIG. 5 illustrates an example of the suction unit 14 that also functions as the air blowing unit 13. The suction unit 14 illustrated in FIG. 5 has a blower duct 143 that guides air released by the suction fan 141 to a first surface of a medium. Air guided to the blower duct 143 is blown to a first surface of a medium supported on the outer circumferential surface of the belt 121. The medium transported by the belt 121 is pressed against the outer circumferential surface of the belt 121 by this air. That is, in this case, the blower duct 143 of the suction unit 14 functions as a pressing unit that presses a portion of a medium to be read by a reading unit against a support unit by guiding and blowing air sucked by the suction fan 141 to a first surface of the medium.

<5> Although the image reading device 1 is configured such that a portion of a medium to be read by the reading unit 11 is pressed against the support unit 12 by blowing air to a first surface of the medium from almost directly above, for example, as illustrated in FIG. 4 in the above exemplary embodiment, a direction in which air is blown is not limited to this.

Figure 6:
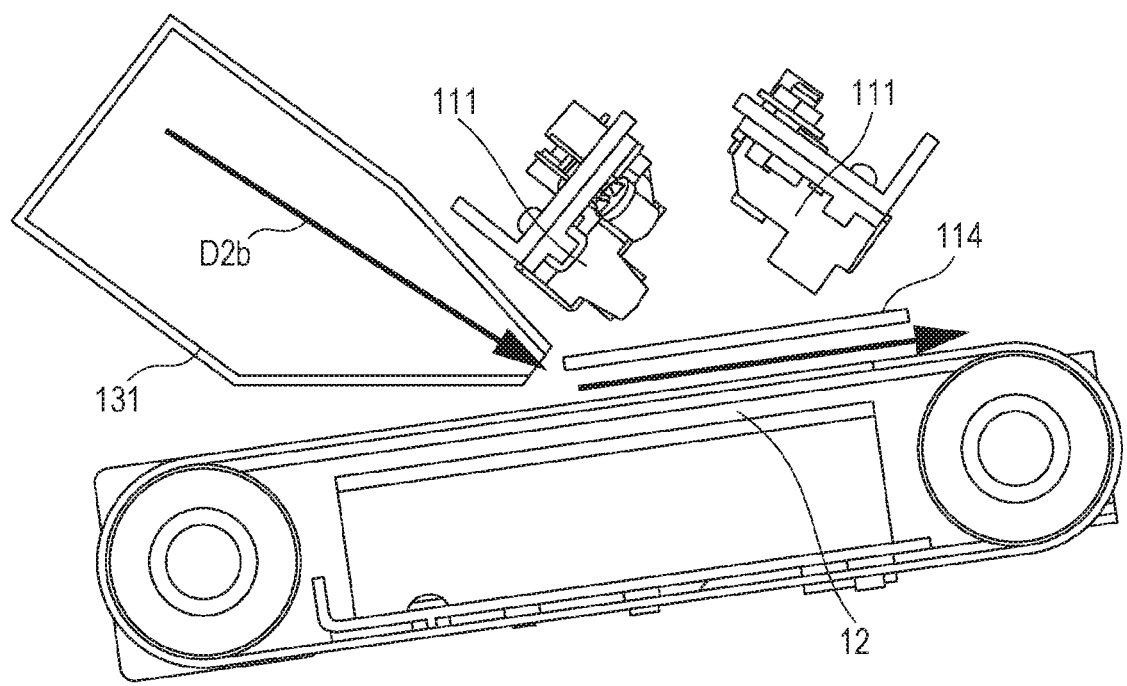
FIG. 6 illustrates an aspect in which air is blown to a medium along a transport direction.

FIG. 6 illustrates an aspect in which air is blown to a medium along a transport direction. As illustrated in FIG. 6, a nozzle 131 is a member that constitutes a part of a pressing unit (the whole of which is not illustrated in FIG. 6) and blows air sent by the air blowing unit 13 to a first surface of a medium.

Protection glass 114 is transparent glass that constitutes a part of the reading unit 11 (the whole of which is not illustrated in FIG. 6). The protection glass 114 is disposed in parallel with a first surface of a medium that is being transported by the support unit 12 and protects a portion of the medium read by the reading unit 11. This protection glass 114 allows passage of light reflected by the medium. An image formed on the medium is read by the reading unit 11 through the protection glass 114.

The nozzle 131 is opened at a position that is located between the protection glass 114 and the support unit 12 and faces an upstream side in a direction in which a medium is transported by the support unit 12. With this configuration, the nozzle 131 blows air sent by the air blowing unit 13 to a first surface of a medium from this opening along arrow D2b illustrated in FIG. 6. The blown air passes a gap between the medium and the protection glass 114 and flows from an upstream side to a downstream side in a direction in which this medium is transported. That is, the nozzle 131 that guides air sent from the air blowing unit 13 to the aforementioned position that faces the upstream side in the medium transport direction is an example of a constituent element of a pressing unit that blows air along a direction in which a medium is transported. Even in this case, air blown from the air blowing unit 13 flows along the direction in which a medium is transported and is therefore hard to inhibit transport of the medium. The nozzle 131 illustrated in FIG. 6 may also function as the blower duct 143.

<6> Although only a single surface of a transported medium is read in the above exemplary embodiment, both surfaces of the medium may be read. In this case, the image reading device 1 may have two reading units 11, two support units 12, and two pressing units.

Figure 7:
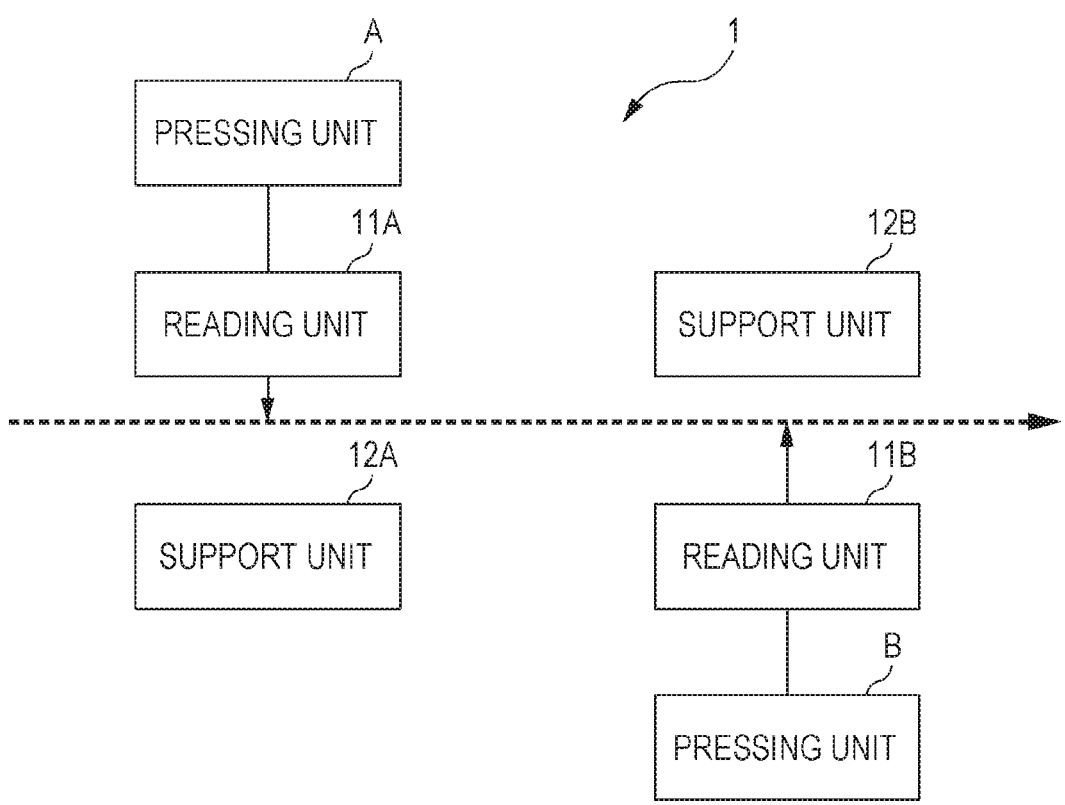
FIG. 7 illustrates an example of an image reading device that reads both surfaces of a medium.

FIG. 7 illustrates an example of the image reading device 1 that reads both sides of a medium. In the image reading device 1 illustrated in FIG. 7, a reading unit 11A, a support unit 12A, and a pressing unit A are disposed on an upstream side in a medium transport direction, and a reading unit 11B, a support unit 12B, and a pressing unit B are disposed on a downstream side of the medium transport direction.

The pressing unit A blows air to a medium transported by the support unit 12A and presses a portion of this medium to be read by the reading unit 11A against the support unit 12A. The medium that has passed the support unit 12A is transported while being supported by the support unit 12B provided on an opposite side of the support unit 12A when viewed from this medium.

The pressing unit B blows air to the medium transported by the support unit 12B and thus presses a portion of the medium to be read by the reading unit 11B against the support unit 12B. A surface supported by the support unit 12B is opposite to a surface supported by the support unit 12A, and the reading unit 11B reads a surface opposite to a surface read by the reading unit 11A. That is, the reading unit 11B reads a second surface opposite to a first surface read by the reading unit 11A. According to this configuration, a medium that has passed through the combination of the reading unit 11A, the support unit 12A, and the pressing unit A passes the combination of the reading unit 11B, the support unit 12B, and the pressing unit B as it is, and thus two images formed on respective surfaces of the medium are read by the image reading device 1.

<7> Although the belt 121 has plural holes disposed in a grid manner in the above exemplary embodiment, the belt 121 is not limited to this. For example, the belt 121 may be a mesh-like member obtained by knitting a thread-like member. The mesh-like member that constitutes the belt 121 may be made of a metal or may be made of an organic material such as natural rubber or a synthetic resin.

A wall surface of the vacuum duct 122 may also be this mesh-like member. Air passes through a gap between thread-like members of the wall surfaces of the belt 121 and the vacuum duct 122.

The support unit 12 has the belt 121 and the vacuum duct 122 but may be, for example, a metal cylindrical drum having a venthole in a wall surface.

<8> Although the reading unit 11 has the optical system 113 that is a reduction optical system in the above exemplary embodiment, the reading unit 11 is not limited to this. The reading unit 11 may have, for example, the imaging element 112 disposed along the support unit 12. In this case, the imaging element 112 may sense reflected light that occurs on a first surface of a medium without passage through an optical system. The pressing unit may blow air to the imaging element 112 disposed along the support unit 12 in addition to a medium supported by the support unit 12. This presses the medium against the support unit 12 and cools the imaging element 112.

<9> Although the image reading device 1 constitutes the image forming apparatus 9 in the above exemplary embodiment, the image reading device 1 is not limited to this. The image reading device 1 may be, for example, a device that reads an image that has been already formed on a medium in another image forming apparatus. This image reading device 1 may determine whether or not the read image has an abnormality and notify a user about a result of the determination.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image reading device comprising:
    a reading unit configured to read an image formed on a first surface of a medium;
    a support unit configured to support the medium from a second surface opposite to the first surface;
    a pressing unit configured to blow air from a first surface side so as to press a portion of the medium to be read by the reading unit against the support unit; and
    a suction unit configured to suck air,
    wherein the support unit is made of a material that allows passage of air,
    wherein the suction unit is configured to suck air sandwiched between the support unit and the medium through the support unit so that the medium approaches the support unit, and
    wherein the pressing unit is configured to blow the air sucked by the suction unit so as to press the portion against the support unit.

2. The image reading device according to claim 1, wherein the support unit is configured to transport the medium while supporting the medium so that the medium passes a position read by the reading unit.

3. The image reading device according to claim 1, wherein the pressing unit is configured to blow the air along a direction in which the medium is transported.

4. The image reading device according to claim 1, wherein the reading unit has an irradiating unit configured to irradiate the first surface; and
    wherein the pressing unit is configured to press the portion against the support unit by using air for cooling the irradiating unit.

5. The image reading device according to claim 1, wherein the reading unit has an imaging element configured to image the image; and
    wherein the pressing unit is configured to press the portion against the support unit by using air for cooling the imaging element.

6. An image forming apparatus comprising:
    an image forming unit configured to form an image on a first surface of a medium;
    a reading unit configured to read the image formed on the first surface of the medium;
    a support unit configured to support the medium from a second surface opposite to the first surface;
    a pressing unit configured to blow air from a first surface side so as to press a portion of the medium to be read by the reading unit against the support unit;
    an inspecting unit configured to inspect the image read by the reading unit; and
    a suction unit configured to suck air,
    wherein the support unit is made of a material that allows passage of air,
    wherein the suction unit is configured to suck air sandwiched between the support unit and the medium through the support unit so that the medium approaches the support unit, and
    wherein the pressing unit is configured to blow the air sucked by the suction unit so as to press the portion against the support unit.

7. An image reading device comprising:
    a reading means for reading an image formed on a first surface of a medium;
    a support means for supporting the medium from a second surface opposite to the first surface;
    a pressing means for blowing air from a first surface side so as to press a portion of the medium to be read by the reading means against the support means; and
    a suction means for sucking air,
    wherein the support means is made of a material that allows passage of air,
    wherein the suction means is for sucking air sandwiched between the support means and the medium through the support means so that the medium approaches the support means, and
    wherein the pressing means is for blowing the air sucked by the suction means so as to press the portion against the support means.

* * * * *